US012722865B2

(12) United States Patent
Boriani

(10) Patent No.: US 12,722,865 B2
(45) Date of Patent: Sep. 1, 2026

(54) CAPSULE FOR CONTAINING AND DISPENSING FOR FLASKS

(71) Applicant: Epoca S.P.A., Bassano del Grappa (IT)

(72) Inventor: Edda Elena Boriani, Bassano del Grappa (IT)

(73) Assignee: Epoca S.P.A., Bassano del Grappa (IT)

( * ) Notice: Subject to any disclaimer, the term of this patent is extended or adjusted under 35 U.S.C. 154(b) by 104 days.

(21) Appl. No.: 18/292,961

(22) PCT Filed: Jul. 18, 2022

(86) PCT No.: PCT/IT2022/050211
§ 371 (c)(1),
(2) Date: Jan. 29, 2024

(87) PCT Pub. No.: WO2023/007520
PCT Pub. Date: Feb. 2, 2023

(65) Prior Publication Data

US 2024/0375842 A1 Nov. 14, 2024

(30) Foreign Application Priority Data

Jul. 27, 2021 (IT) ........................ 102021000020039

(51) Int. Cl.
*B05B 11/00* (2023.01)
*B65D 51/28* (2006.01)
(Continued)

(52) U.S. Cl.
CPC ...... *B65D 77/0493* (2013.01); *B05B 11/0081* (2013.01); *B65D 51/2821* (2013.01); *B65D 51/285* (2013.01); *B65D 81/3222* (2013.01)

(58) Field of Classification Search
CPC ............ B65D 77/0493; B65D 51/2821; B65D 51/285; B65D 81/3222; B05B 11/0081
See application file for complete search history.

(56) References Cited

U.S. PATENT DOCUMENTS 5,421,483 A 6/1995 Parise
5,529,216 A * 6/1996 Klima ................ B05B 11/0086 239/304
(Continued)

FOREIGN PATENT DOCUMENTS

| | | |
|---|---|---|
| CN | 106163939 | 11/2016 |
| CN | 111788008 | 10/2020 |
| JP | 2010-274993 | 12/2010 |

OTHER PUBLICATIONS

International Search Report and the Written Opinion Dated Dec. 9, 2022 From the International Searching Authority Re. Application No. PCT/IT2022/050211. (12 Pages).
(Continued)

*Primary Examiner* — Frederick C Nicolas

(57) ABSTRACT

A capsule for containing and dispensing a component, intended to be housed in a flask having a dispenser connected to a dip tube. The capsule includes, a first side wall, a second bottom wall at least partially removable, which define a cavity intended to contain the component, an opening for access to the cavity delimited by an upper margin, a hole at a position adjacent and contiguous to the upper margin to allow the dip tube to reach the bottom of the flask, a first constriction or reduction in diameter and/or a second constriction located on an inner face thereof and proximate to the upper margin.

Another object is a piston intended to be inserted into such a capsule.

9 Claims, 3 Drawing Sheets

(51) Int. Cl.
*B65D 77/04* (2006.01)
*B65D 81/32* (2006.01)

(56) References Cited

U.S. PATENT DOCUMENTS

| | | | | |
|---|---|---|---|---|
| 5,836,479 | A * | 11/1998 | Klima | B05B 11/0097 222/83.5 |
| 5,947,332 | A * | 9/1999 | Klima, Jr. | B05B 11/0097 222/130 |
| 6,041,969 | A | 3/2000 | Parise | |
| 6,182,865 | B1 * | 2/2001 | Bunschoten | B05B 11/0078 222/383.1 |
| 6,290,100 | B1 | 9/2001 | Yacko et al. | |
| 8,794,474 | B2 * | 8/2014 | Mueller | B05B 11/0081 215/44 |
| 2003/0038186 | A1 | 2/2003 | Klima et al. | |
| 2009/0289025 | A1 | 11/2009 | Mueller et al. | |
| 2010/0084368 | A1 | 4/2010 | Sim | |

OTHER PUBLICATIONS

Rapporto di Ricerca e l'Opinione Scritta [Search Report and the Writtern Opinion] Dated Apr. 19, 2022 From the Ministero Dello Sviluppo Economico, Direzione Generale Sviluppo Produttivo e Competitivita, Ufficio Italiano Brevetti e Marchi Re. Application No. IT 202100020039. (10 Pages).

Notification of Office Action and Search Report Dated Oct. 22, 2025 From The State Intellectual Property Office of the People's Republic of China Re. Application No. 202280052948.4. and Its Translation Into English. (12 Pages).

* cited by examiner

CAPSULE FOR CONTAINING AND DISPENSING FOR FLASKS

RELATED APPLICATIONS

This application is a National Phase of PCT Patent Application No. PCT/IT2022/050211 having International filing date of Jul. 18, 2022, which claims the benefit of priority of Italy Patent Application No. 102021000020039 filed on Jul. 27, 2021. The contents of the above applications are all incorporated by reference as if fully set forth herein in their entirety.

FIELD AND BACKGROUND OF THE INVENTION

The present invention relates to a capsule for containing and dispensing for flasks.

More particularly, the invention relates to a capsule, which can be installed inside a containment volume of a flask or container in general, and which can be used to keep a substance separate from the contents of the flask until it is used.

Similar containers have been known and commercially available for some time, and respond to the need to store two or more components of a mixture in the same container, but separate from each other, for more or less extended periods.

The need arises because these components, if mixed, would give rise to a product that would undergo rapid and unacceptable deterioration.

SUMMARY OF THE INVENTION

An example of this are the containers used in pharmaceuticals or—more generally—in the treatment of living organisms, in which the active ingredient is stored, in powder form, in a small sealed container, positioned at the top of a flask, which in turn houses a solvent, almost always a liquid.

When the active ingredient is to be administered, the mechanical action of the user on the flask, usually exerted on the cap when it is opened, breaks the walls of the container storing the powder component, allowing it to mix with the solvent.

Containers or cartridges of this kind are also naturally used in flasks for cleaning and/or sanitising products, which often have the same need to separate a component from the solvent contained in the flask volume, until it is used.

The containers used in all these applications necessarily include a dispensing system for the treatment liquid, for example of the spray or 'trigger' type.

The sprayer normally comprises a main body equipped with a dispensing spout; the body can be screwed to the top of the flask in place of the cap, and includes a pick-up for the liquid contained in the flask.

Inside the body are housed the mechanical components (springs, pistons, etc.) which, when the trigger is actuated by the user, draw the liquid from the flask via the pick-up tube and dispense it outside.

In the containers used in these types of flasks for storing the second component of the mixture, a through channel is necessarily cut to allow the dip-pipe to be housed.

This requirement must be combined with the need to accommodate, inside the separate container, the plunger or piston intended to break its walls when the spray is screwed completely into the flask.

Furthermore, these containers are positioned in the upper portion of the flask, which, being intended to be gripped by the user, should preferably have an elongated shape and a reduced width.

Consequently, the containers themselves possess an elongated shape, having one dimension in space greater than the other two, namely depth.

The types of systems described here have a number of drawbacks, mainly related to bulk, arising from the structural criteria they must meet.

The presence of the channel for the passage of the dipstick through the container subtracts space from the volume that can be used to house the second component to be mixed.

Consequently, it is only possible to store a limited quantity of component without increasing the size of the cartridge; this, however, inevitably leads to a reduction in the main volume of the flask.

In addition, it must be considered that inside the container of the second component is also housed the piston used to break the bottom wall, which subtracts further volume from the component.

Furthermore, since the plunger is generally attached to the spray body, it overlaps with the piston, and must necessarily pass through the piston itself to reach the volume of the flask.

This necessitates additional efforts with regard to the design of the piston, to try to reduce its size as much as possible.

On the other hand, it is possible that pistons designed with a more compact design will not perform as well, being structurally weaker, and may cause problems with the cartridge bottom wall breaking.

The difficulty in piston design lies further in the fact that the presence of the plunger often does not allow an adequate seal to be achieved at the contact interface between the side walls of the cartridge and the surface of the piston itself.

Finally, another problem deriving from the encumbrance of the dipstick and piston within such a small space is the increased difficulty in filling the cartridge.

Therefore, there is a need to provide a capsule for containing and dispensing for flasks that can solve the aforementioned drawbacks, in particular relating to the size and operation of the capsule in the flask, and to the possible filling methods.

It is therefore an object of the present invention to realise a capsule for containing and dispensing for flasks which has a design which is at the same time efficient but simple for the user to operate.

In particular, it is an object of the invention to provide a capsule for containing and dispensing for flasks that can be easily filled with the active ingredient of the mixture to be kept separate until it is used.

A further object of the invention is to provide a a capsule for containing and dispensing for flasks whose walls can be easily and efficiently broken when needed.

It is also an object of the present invention to provide a capsule for containing and dispensing for flasks which is easy to assemble and manipulate, either by manual actions of an operator, or by automatic actions of a machine.

It is also an object of the invention to provide a capsule for containing and dispensing for flasks that is compatible with various types of sprays or dispensers, even if they have different positions for attaching the dipstick to the body.

BRIEF DESCRIPTION OF SEVERAL VIEWS OF THE DRAWINGS

The present invention will be now described, by way of non-limiting example, according to certain preferred embodiments thereof, and by means of the appended drawings, in which.

DESCRIPTION OF SPECIFIC EMBODIMENTS OF THE INVENTION

Figure 1A:
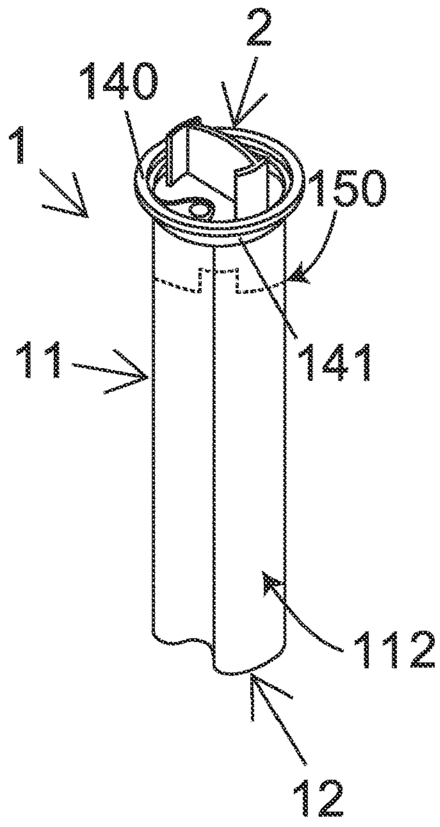
FIG. 1A is a perspective view of the capsule according to the invention in which the bottom wall rupture piston or plunger is inserted.

Referring to FIG. 1, a preferred embodiment of the capsule 1 for containing and dispensing according to the invention, within which a piston or plunger 2 is inserted.

Figure 1B:
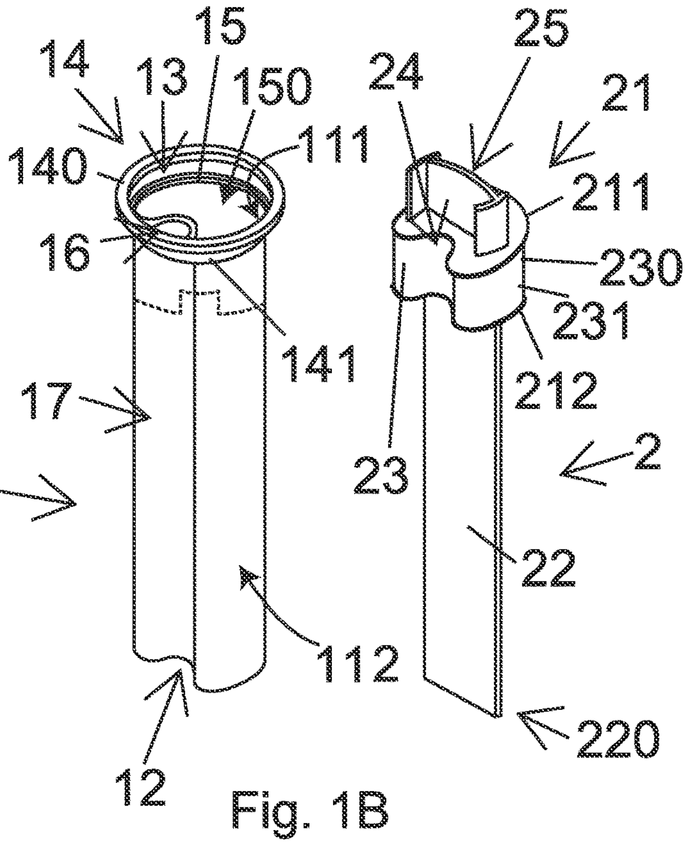
FIG. 1B is a perspective view of the capsule according to the invention with the piston or plunger out of its seat in the capsule.
Figure 2:
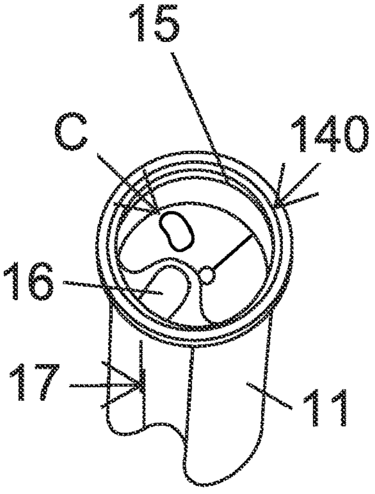
FIG. 2 is a perspective view from above of the capsule alone filled with the component to be kept separate.
Figure 3:
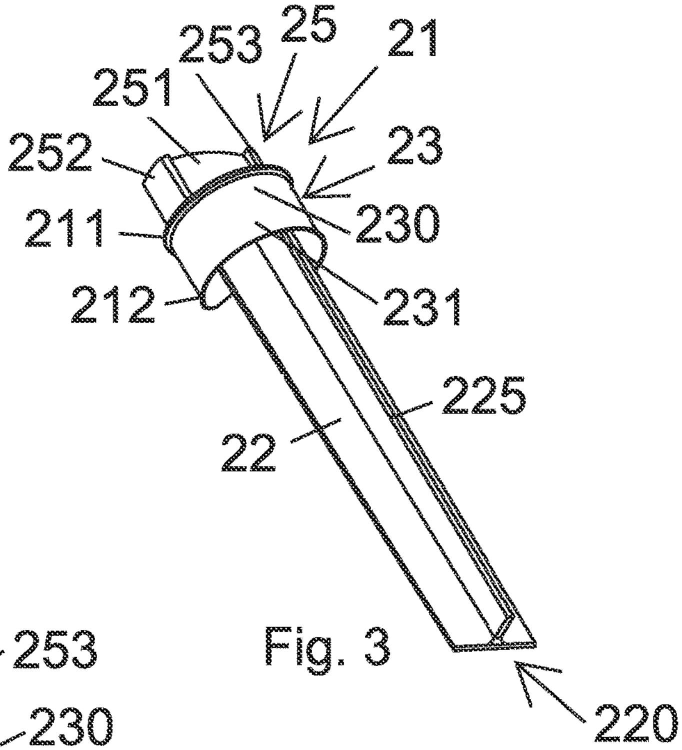
FIG. 3 is a perspective view of the piston or plunger alone separated from the containment capsule.
Figure 4A:
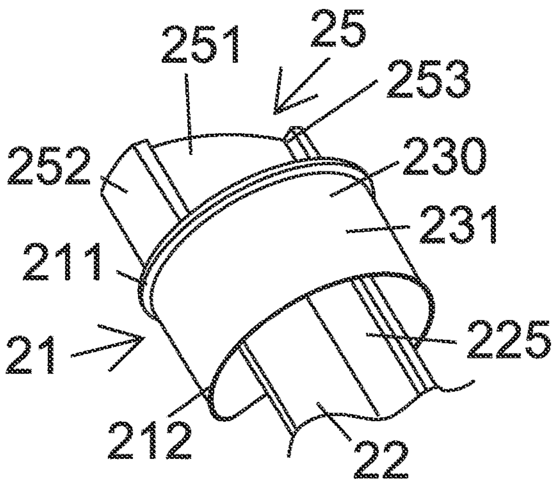
FIGS. 4A and 4B are detail views of the piston or plunger.
Figure 4B:
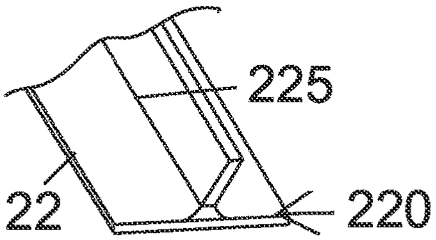
Figure 4C:
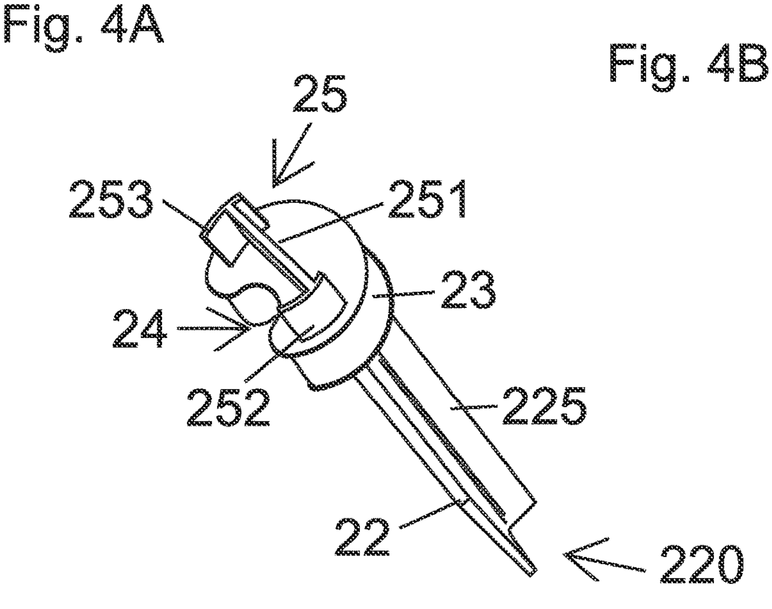
FIG. 4C is a perspective view from above of the piston or plunger.

As visible in FIGS. 1B and 2, the capsule 1 has a first wall or side wall 11 and a second wall or bottom wall 12.

The bottom wall 12 is at least partially breakable, or at least partially removable with respect to the side wall 11.

In particular, when the flask is used, the piston 2 exerts a pressure force on the bottom wall 12, shattering it at least partially or causing it to detach at least partially.

Preferably, the capsule 1 has an elongated shape, to best fit the dimensions of the flask handle (not shown for simplicity) which is intended to accommodate the capsule 1 itself.

The walls 11, 12 delimit a cavity 13 intended to accommodate a component C (e.g. liquid, powdered solid, etc.) separately from the main volume of the flask, which contains an appropriate solvent.

The side wall 11 accordingly comprises an inner face 111 and an outer face 112.

An opening 14, located at the top of the capsule 1, allows access to the cavity 13, and thus its filling with the component C.

The opening 14 is bounded externally by an upper margin 140, substantially configured as a circular crown extending perpendicularly to the side wall 11.

Inferiorly to the upper margin 140 is a lower margin 141, substantially configured as a variation of section of the side wall 11, which results in the division of the side wall into a first portion, facing towards the upper margin 140, having a first outer diameter, and a second portion facing towards the opposite direction and having a second outer diameter smaller than the first section.

Once the capsule 1 is placed in position in the neck of a flask, the upper margin 140 contacts the dispensing device, preferably to adhere to a suitable gasket and make a seal with the latter, sealing the flask.

The lower margin 141, on the other hand, is intended to contact the inner wall of the neck of the flask, so as to hold the capsule 1 in its position by interference. Such coupling between capsule and flask at the lower margin 141 ensures a seal between the aforementioned elements.

In a preferred embodiment, on the inner face 111 of the side wall 11 and in proximity to the margin 140 there is a first constriction 15, i.e. a reduction in the cross-section of the cavity 13, which results in a surface transverse to the inner face 111, substantially parallel to the margin 140 of the opening 14 at a position slightly below the upper margin 140 itself.

In other words, the transverse surface of the first constriction 15 extends along the inner face 111 of the side wall 11, preferably in a closed profile pattern.

Preferably, the lateral wall 11 has a second constriction, 150 on its inner face 111.

The second constriction 150 of the diameter of the wall 11 begins inferiorly to the first constriction 15 and at a distance substantially equal to the length of the head 21 of the piston 2, as will be detailed below.

The second constriction 150 extends at least partially along the side wall 11.

In a preferred embodiment, the second constriction 150 terminates at the intersection of the side wall 11 with the bottom wall 12 of the capsule 1.

Further, on the top of the capsule 1, substantially at the upper margin 140, a hole 16 of smaller size than the opening 14 is formed.

Preferably, the hole 16 is located adjacent and contiguous to the upper margin 140.

In particular, it may be advantageously tangent internally to the upper margin 140 and/or the bottom margin 141, and lie in a plane substantially parallel to the plane of lying of the upper margin 140 and/or the bottom margin 141, or of the opening 14.

Accordingly, the hole 16 is in a centrally offset position; in other words: it is off-axis with respect to the shape of the opening 14 if this were represented in a plan view.

Said hole 16, together with a recess 17 on the side wall 11 of the capsule 1, in correspondence with the hole 16 itself, acts as a passage channel for the nozzle pickup (not shown), so as to allow its open end to reach the bottom of the flask.

The off-centre position of the hole 16 thus allows the dip-pipe to be accommodated externally to the capsule 1.

Said recess 17 may advantageously extend along the entire length of the capsule 1, starting from the hole 16 located at the top of the capsule 1 itself, near the opening 14, to the bottom wall 12 opposite the latter.

In this way, the dipstick is accommodated laterally to the capsule 1, within the recess 17 itself.

In other words, if one imagines viewing capsule 1 from above, both hole 16 and recess 17 appear to be contained within the perimeter of the upper margin 140; hole 16 is contiguous to margin 140 itself, while recess 17 extends below hole 16 itself.

Advantageously compared to the prior art, which involves a hole and a channel placed centrally in the capsule, in the capsule 1 according to the invention the dipstick does not pass through the cavity 13 of the capsule 1 to reach the bottom of the flask.

In a preferred embodiments of the invention, moreover, the hole 16 may have an elliptical or oval shape so as to be compatible with multiple positions of the dipstick in the flasks in which the capsule 1 is intended to be housed.

In fact, the capsules 1 of the invention are produced in different plants than those that produce the flasks for dispensing the final mixture. For this reason, and a certain tolerance in the position of the dipstick must always be taken into account in order for it to fit precisely within the hole 16, as this position is determined by various different factors.

This translates into a number of advantages, such as:

- the possibility of reducing the size of the capsule in the flask with equal capsule capacity, due to the better volume distribution;
- ease of filling the capsule, since most of the opening 14 is not obstructed by the passage channel of the dipstick.

Considering a plan view, the capsule 1 roughly assumes a “U” shape, with the recess 17 forming the hollow of the “U” itself.

The “U” shape substantially coincides with the shape of the bottom wall 12 of the capsule 1, which therefore has a first tip 121 and a second tip 122.

The capsule 1 has a thinner thickness of material at the intersection of the side wall 11 and the bottom wall 12, to facilitate the breaking action of the plunger 2.

Preferably, the first and second tips 121, 122 are designed to function as anchor points of the bottom wall 12 to the capsule 1 when the same is broken by the action of the plunger 2, as will be better described below.

In further embodiments of the capsule 1, there is at least one anchor point alternative to or additional to those described, positioned along the intersection of the side wall 11 and the bottom wall 12.

Referring now to FIGS. 1B-4C, there is shown a piston or plunger 2, intended to be housed within the cavity 13.

The piston 2 comprises a head 21 and a stem 22.

The head 21 possesses a first side surface 23, configured to at least partially contact a portion of the inner face 111 of the first wall 11 of the capsule 1, sealing the opening 14 and making an airtight seal.

Preferably, contact with the first surface 23 of the head 21 of the plunger 2 is made at the portion of the capsule 1 comprising the first constriction 15.

Advantageously, the head 21, preferably its side surface 23, may comprise a first rim 211 on its top, configured to contact the first striation 15 of the inner face 111 of the capsule 1.

Optionally, the head 21 may comprise a second rim 212 placed inferiorly and at a certain distance from the first rim 211; the second rim 212 contacts the second striation 150 of the lateral face 11 of the capsule 1, in order to obtain the maximum possible tightness.

Accordingly, when the head 21 is inserted into the cavity 13 of the capsule 1, its travel is limited by two limit switches formed in the capsule 1 itself, namely the second constriction 150 and the first constriction 15.

The first constriction 15 acts as the end stop for the first rim 211 when the head 21 is completely inserted into the cavity 13 of the capsule 1.

On the other hand, the height of the side surface 23 of the head 21 defines the distance from the first constriction 15 at which the second constriction 150 of the side wall 11 of the capsule 1 begins.

The stroke of the head 21 stops when the second rim 212, as mentioned above, comes into contact with the second constriction 150.

The constriction 150 thus functions as both a seal and a limit stop.

In a preferred embodiment, the side surface 23 of the head 21 has an upper portion 230 and a lower portion 231, which correspond to two respective horizontal bands identified on the surface 23 itself.

In a preferred embodiment, the upper portions 230 and lower portions 231 have a smaller cross-sectional area than the first rim 211 and/or the second rim 212.

Preferably, the lower portion 231 has a smaller cross-sectional area than the upper portion 230.

Advantageously, when the head 21 is inserted into the cavity 13, the reduction in cross-sectional area of the portions 230 and 231 makes it possible to decrease the sliding surface between the head 21 and the inner face 111 of the capsule 1, reducing friction and facilitating its insertion into the cavity 13 itself; moreover, part of the contained air can flow into the cavity between the upper portion 230, and/or the lower portion 231, and the side wall 11, facilitating the insertion of the head 21 itself.

The head 21 is shaped to have a groove 24 along its entire height, which follows the recess 17.

Further, the head 21 comprises, in a preferred embodiment thereof, handling or grasping means 25 placed on its top and in protrusion therefrom.

Such handling means 25 are intended to be gripped manually by an operator, or by an automatic machine using grippers or jaws, for example, to allow the plunger 2 to be inserted into position within the cavity 13, after filling with the component C.

Advantageously, to facilitate manipulation of the piston 2 and offer the greatest possible versatility, the handling means 25 may have an H, I or U profile, with a core 251, and a first wing 252 and a second wing 253 substantially perpendicular to the core 251.

In fact, the presence of the substantially right angles ensures that gripping is centred and symmetrical by the automatic grippers.

When the plunger 2 is inserted and gripped within the capsule 1, the stem 22 of the plunger 2 extends the full length of the capsule 1 itself.

A terminal end 220 of the stem 22 is located near the bottom wall 12.

It may remain detached and not in contact with the bottom wall 12 until the moment when the capsule 1 is used, or it may come into contact with the bottom wall 12 even before the moment when the wall 12 is to be crushed or otherwise separated from the wall 11.

In a preferred embodiment, the stem 22 of the piston 2 has a T-profile, and thus comprises an additional rib 225.

This gives the stem better rigidity and increases the bending resistance resulting from the pressure action exerted by the plunger 2 when breaking the bottom wall 12.

In an embodiment, one or more rebate profiles (not shown) for the stem 22 are formed on the bottom wall 12, extending perpendicularly thereto and towards the inside of the cavity 13.

In a further embodiment, such profiles correspond to an increased thickness of the bottom wall 12 in the central area, or in any case in the area of contact with the stem 22.

Operationally, after the capsule 1 is filled with the chosen component C, the piston 2 is positioned, manually or with manipulator tools, in the cavity 13 through the opening 14, orienting the groove 24 towards the hole 16.

Insertion takes place until a seal of the side surface 23, preferably of the second rim 212, with the inner face 111 of the side wall 11 of the capsule 1 is achieved.

At this point, the capsule 1 with the piston 2 inside it is ready to be connected to a dispenser, of a known type itself, and to be inserted into a flask.

The dispenser will be of the type that can be screwed to the mouth of the flask so that, when screwed fully on use, it will cause the piston 2 to move towards the bottom wall 12 of the capsule 1.

The insertion is completed when at least the sealing of the second rim 212 of the side surface 23 with the second constriction 150 of the wall 11 of the capsule 1 is realised.

Optionally, and additionally, the contact of the first rim 211 with the first constriction 15 is also realised.

In addition, when the dispenser is fully screwed in, it makes a seal with the upper margin 140 of the capsule, preferably by means of an interposed gasket, so as to prevent liquid from escaping from the mouth of the flask and through the dispenser.

The terminal end 220 breaks the bottom wall 12, releasing the component C into the solvent contained in the flask and allowing it to mix.

The T-shape of the stem 22 improves the pushing efficiency by concentrating the bulk of the breaking force exerted at three points.

Figure 5A:
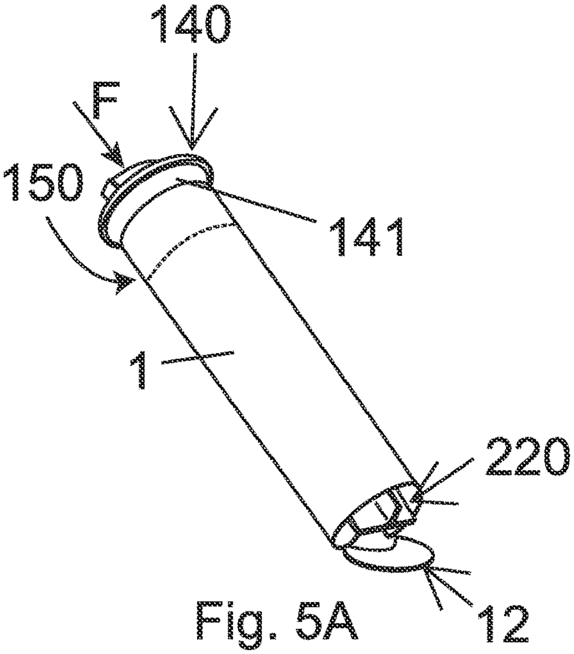
FIGS. 5A and 5B show the capsule in a use configuration as it is being broken by the piston or plunger.
Figure 5B:
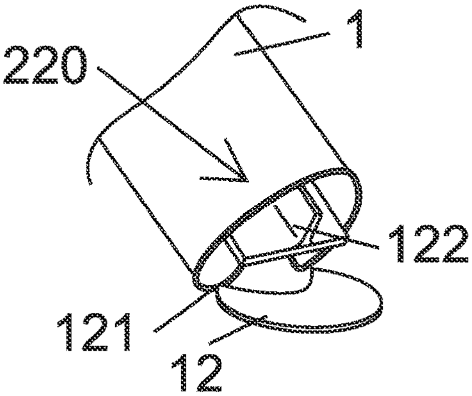
Figure 6A:
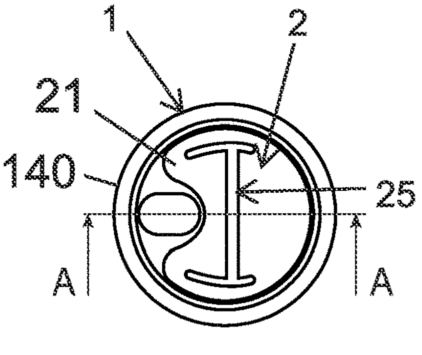
FIG. 6A show a top view of the capsule of FIG. 1A.
Figure 6B:
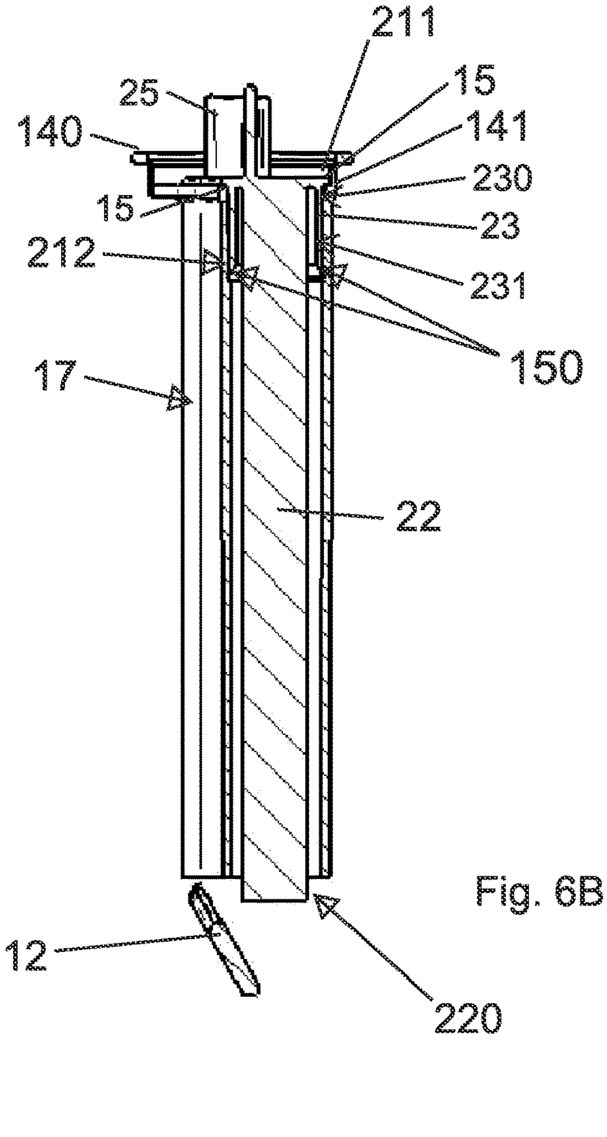
FIG. 6B show a cross section AA of the capsule of FIG. 6A.

Advantageously, the bottom wall 12 remains anchored to the capsule 1 by means of the tips 121, 122, avoiding dispersion in the mixture and possibly obstructing the dipstick, as shown in FIGS. 5A and 5B.

The invention thus conceived and illustrated is susceptible to modifications and variations, all of which are within the inventive scope of the appended claims.

Furthermore, all details may be replaced by other technically equivalent elements.

Finally, the components used, provided they are compatible with the specific use, as well as the dimensions, may be any according to the requirements and state of the art.

Where features and techniques mentioned in the claims are followed by reference marks, such reference marks have been included for the sole purpose of increasing the intelligibility of the claims and, consequently, have no limiting effect on the interpretation of each element identified by way of example by such reference marks.

The invention claimed is:

1. A capsule for containing and dispensing a component, intended to be housed in a flask having a dispenser connected to a dip tube, comprising:

a first side wall, a second bottom wall, which define a cavity intended to contain said component;

an opening for access to the cavity delimited by an upper margin; and a hole at a position adjacent and contiguous to the upper margin to allow the dip tube to reach the bottom of the flask;

wherein the second bottom wall is at least partially removable or frangible to allow release of the component within the flask;

wherein the first side wall comprises a first constriction or reduction in diameter and/or a second constriction located on an inner face thereof and proximate to the upper margin.

2. The capsule according to claim 1, wherein a recess is formed along an outer face of the first side wall, extending from the hole to the second bottom wall, for accommodating the dip tube.

3. The capsule according to claim 1, wherein the second bottom wall is shaped in a "U" shape, presenting a first tip and a second tip for anchoring to the capsule.

4. A piston intended to be inserted into the capsule according to claim 1 for breaking the second bottom wall, comprising a head and a stem, wherein the head is intended to at least partially contact a portion of the inner wall of the capsule proximate of the opening so as to close the opening, wherein the head is shaped so as to present a groove that does not to interfere with the hole of the capsule.

5. The piston according to claim 4, wherein the head comprises a first rim and/or a second rim, wherein the first rim is configured to contact the first constriction of the capsule, and/or the second rim is configured to contact the second constriction of the first wall of the capsule, so as to provide a mechanical seal.

6. The piston according to claim 4, wherein the head has a side surface having an upper portion and a lower portion, wherein the upper portion and the lower portion have a smaller cross-sectional area than the first rim and/or the second rim, and/or wherein the lower portion has a smaller cross-sectional area than the upper portion.

7. The piston according to claim 4, wherein the head comprises handling means located on a top of the piston and protruding with respect to the piston.

8. The piston according to claim 4, wherein the stem has a T-shaped profile.

9. A kit comprising the capsule and the piston according to claim 1.

* * * * *